United States Patent
Prat Urreiztieta (10) Patent No.: US 6,598,654 B2
(45) Date of Patent: *Jul. 29, 2003

(54) MOLDING SAND APPROPRIATE FOR THE FABRICATION OF CORES AND MOLDS

(75) Inventor: Jaime Prat Urreiztieta, Las Arenas-Guecho (ES)

(73) Assignee: Iberia Ashland Chemical, S.A., Las Arenas-Guecho (ES)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,904
(22) PCT Filed: Dec. 26, 1997
(86) PCT No.: PCT/ES97/00314
§ 371 (c)(1),
(2), (4) Date: Jul. 1, 1999
(87) PCT Pub. No.: WO98/29353
PCT Pub. Date: Jul. 9, 1998

(65) Prior Publication Data
US 2002/0108733 A1 Aug. 15, 2002

(30) Foreign Application Priority Data
Dec. 27, 1996 (ES) ............................................... 9602752
Dec. 22, 1997 (ES) ............................................... 9702667

(51) Int. Cl.$^7$ ................................................. B22C 9/00
(52) U.S. Cl. .......................... 164/16; 164/529; 164/359; 164/517; 164/361; 164/369
(58) Field of Search .......................... 164/16, 361, 529, 164/369, 53, 54, 359, 517

(56) References Cited

U.S. PATENT DOCUMENTS

| 4,874,726 A | 10/1989 | Kleeb et al. ................. 501/124 |
| 5,443,603 A | * 8/1995 | Kirkendall .................... 51/296 |
| 5,522,447 A | * 6/1996 | Sandstrom et al. ............ 164/28 |
| 5,632,326 A | * 5/1997 | Gough ........................ 164/529 |

FOREIGN PATENT DOCUMENTS

WO          9423865          10/1994

* cited by examiner

*Primary Examiner*—Tom Dunn
*Assistant Examiner*—I.-H. Lin
(74) *Attorney, Agent, or Firm*—Ladas & Parry

(57) ABSTRACT

The molding sand comprises hollow microspheres of aluminum silicate, preferably with an aluminum content between 15 and 45% by weight, a wall thickness between 3 and 10% of the particle diameter and a particle size between 10 and 350 μm. These sands are useful to manufacture low density cores with good "veining" and penetration characteristics, moreover maintaining the mechanical properties of the core obtained. These cores are useful in the manufacture of iron casting.

10 Claims, 5 Drawing Sheets

01. Phenolic urethane
02. Epoxy acrylic
03. Acrylic
04. Silica sand + 10% microspheres according to the invention
05. Recovered furanic sand
06. 70/30 Silica sand/ chromite
07. 50/50 Silica sand/ chromite
08. Silica sand + 2% BR - 022
09. Silica sand + 2% coal
10. Seggar clay
11. 50/50 Electrofused silica
12. Treated olivine
13. Thermally recovered sand
14. Silica sand + 10% veinseal 14000

01. Phenolic urethane
02. Epoxy acrylic
03. Acrylic
04. Silica sand + 10% microspheres according to the invention
05. Recovered furanic sand
06. 70/30 Silica sand/ chromite
07. 50/50 Silica sand/ chromite
08. Silica sand + 2% BR - 022
09. Silica sand + 2% coal
10. Seggar clay
11. 50/50 Electrofused silica
12. Treated olivine
13. Thermally recovered sand
14. Silica sand + 10% veinseal 14000

FIG. 1

01. Phenolic urethane
02. Epoxy acrylic
03. Acrylic
04. Silica sand + 10% microspheres according to the invention
05. Recovered furanic sand
06. 70/30 Silica sand/ chromite
07. 50/50 Silica sand/ chromite
08. Silica sand + 2% BR - 022
09. Silica sand + 2% coal
10. Seggar clay
11. 50/50 Electrofused silica
12. Treated olivine
13. Thermally recovered sand
14. Silica sand + 10% veinseal 14000

MOLDING SAND APPROPRIATE FOR THE FABRICATION OF CORES AND MOLDS

CROSS-REFERENCE TO RELATED APPLICATION

This application is a 371 of PCT/ES97/00314 filed on Dec. 26, 1997.

FIELD OF THE INVENTION

This invention is related to the manufacture of iron casting and, specifically, it refers to a molding sand for casting, suitable for manufacturing cores and chill molds, incorporating hollow microspheres of aluminum silicate.

BACKGROUND OF THE INVENTION

The iron casting obtained by using cores manufactured with molding sand, generally have a series of defects in their shape, such that it is necessary to subject them to machining to obtain a dimensionally correct piece. These defects are produced due to the heating the core suffers due to the effect of the molten metal poured over it, provoking its expansion and hence, the appearance of fissures on its surface. The molten metal penetrates these fissures, hence forming a kind of partition wall or laminas on the surface of the piece obtained. This undesired effect is known "veining" or "rat's tail".

At present, the cores are manufactured using molding sands and gas- or heat-cured resins, or self-curing resins, together with additives destined to improve the characteristics of the piece obtained.

To prevent the formation of "veining", a series of techniques are known and used, such as:

The Use of Iron Oxide as an Additive

The iron oxides used as additives, are destined to minimize the problems created by the expansion of the silica contained in the sands, being used for such a purpose red, black, yellow iron oxides or iron oxide from Sierra Leone, which are incorporated to the mixture in percentages varying from 1 to 3%. These oxides act as a factor for the formation of feyalite, such that the "veining" is minimized during the formation of the fissure. Nevertheless, this technique besides not eliminating "veining" in some cases, has as a disadvantage that the iron oxide reduces the mechanical resistance of the core and moreover the formation of feyalite increases the tendency to penetration, causing the external surface of the piece obtained to present irregularities, which should be treated later.

Use of Wood Flours and Coal Powder

According to this technique, wood flour or coal powders are added in proportions varying from 1 to 3%. These flours burn during melting, hence leaving free gaps distributed throughout the volume of the core, permitting that the expansion of the silica is produced in these gaps without the need to increase the external size, hence avoiding the appearance of fissures provoking "veining". The main disadvantage of this technique is that when the flours burn, a large amount of gas is produced which, on circulating, may result in dimensional problems in the pieces obtained. Likewise, with this type of additive, a reduction in the mechanical resistance of the cores is produced.

Use of Titanium Oxide as an Additive

This new technique described in the U.S. Pat. No. 4,735,973, is based on the use of titanium oxide additives, the additive being present at percentages varying between 0.5 and 5% of the total amount of sand and said additive containing between 15 and 95% titanium oxide. With this technique, thermal expansion is reduced, preventing, as a result "veining", maintaining the mechanical resistance of the cores and not producing an increase in gas production. The disadvantage of this technique lies in the fact that the cores obtained possesses a certain tendency to penetration, it being necessary to apply paints or other treatments on the surface of the cores obtained before proceeding to melting the piece.

Use of Natural Sands of Low Expansion

This new technique uses for the formation of the core, special sands of the rounded of sub-angular silica type, chromate sands, zirconium sands and olivine sands, which, due to their different degrees of thermal expansion, result in the reduction of "veining", and even to its total elimination. The basic disadvantage of this technique is the high cost of this type of sand, with the consequent increase in the cost to obtain the cores.

Use of Electrofused Sands of Low Expansion

According to this technique, the silica sand normally used for the manufacture of cores is melted in electric ovens, until obtaining a kind of paste without expansion capacity. Then, the paste obtained is ground until obtaining a sand powder which is mixed approximately at 50% with silica sand. In this way, the expansion of the core is avoided, since the powder obtained from the silica paste does not have a capacity for expansion and hence, neither produces fissures nor the corresponding veining. The basic disadvantage of this technique is the greater complexity of the production process, which makes the final cost to obtain the cores more expensive.

As may be appreciated, the techniques normally used to prevent the formation of "veining" consist either in the use of additives (iron oxide, titanium oxide, wood flours and coal powder) or in the use of special sands (natural sands of low expansion or electrofused sands of low expansion).

Now it has been found that it is possible to improve the quality of the iron casting by using cores or molds manufactured with molding sands incorporating hollow microspheres of aluminum silicate.

As a result, a purpose of this invention comprises a molding sand for casting which incorporates hollow microspheres of aluminum silicate.

An additional purpose of this invention comprises a process to manufacture cores or chill molds including the use of the molding sand indicated above. The resulting cores and molds also comprise a purpose of this invention.

Another additional purpose of this invention comprises a process to manufacture iron casting including the use of the cores or molds mentioned above. The resulting iron casting also comprises a purpose of this invention.

SUMMARY OF THE INVENTION

The invention provides a molding sand for casting which incorporates hollow microspheres of aluminum silicate in an amount between 1 and 30% by weight with respect to the total amount of molding sand.

The molding sand, purpose of this invention, is suitable to manufacture cores and chill molds which, in turn, may be used in the manufacture of iron casting.

The use of hollow microspheres of aluminum silicate prevents the appearance of fissures during core expansion, but without increasing gas production and maintaining the mechanical properties of the core obtained. During melting of the piece, the expansion of the silica in the molding sand does not cause an increase of the core, but the expansion is absorbed by the internal spaces of the hollow microspheres, by which the appearance of fissures on the core surface is totally prevented and, as a result, "veining".

With the molding sand of the invention, cores or molds are obtained of lesser density, by which gas production is reduced, but without decreasing its mechanical resistance. Likewise, the penetration of the piece obtained is reduced, due to the fact that the hollow microspheres of aluminum silicate cover the interstitial spaces of the core producing an effect similar to that of paint, improving the surface of the piece obtained. Therefore, the quality of the resulting iron casting is improved due to the reduction of the defects caused by core expansion and gas production.

DETAILED DESCRIPTION OF THE INVENTION

The invention provides a molding sand for casting incorporating hollow microspheres of aluminum silicate at an amount between 1 and 30% by weight with respect to the total amount of sand, preferably between 5 and 25% and more preferably, between 10 and 20%, by weight.

Preliminary tests intended to prevent the formation of "veining" on the iron casting surface showed the possibility of using hollow microspheres of aluminum silicate as an additive for molding sands destined to manufacture cores and chill molds.

Further tests permitted the verification that good results are obtained when the hollow microspheres of aluminum silicate used have an aluminum content between 15 and 45% by weight, based on the weight of the hollow microspheres of aluminum silicate, preferably between 20 and 35% by weight.

For their use in this invention, all kinds of hollow microspheres of aluminum silicate may be used, preferably those satisfying the aforementioned characteristics, such as those marketed by the PQ Corporation under the trade mark Extendospheres, and those marketed by Microfine Minerals Limited under the trade mark Metaspheres 50. In Table 1, the main characteristics of the different microspheres used in the tests carried out are indicated.

Contrary to that expected, it was surprising to verify that the hollow microspheres of aluminum silicate of the best quality, understanding as such those microspheres with a relatively high aluminum content, typically between 35 and 45% by weight, give worse results than when hollow microspheres of aluminum silicate of less quality are used, that is, with an aluminum content less than 35% by weight.

The tests performed with different hollow microspheres of aluminum silicate, incorporated at different proportions to the molding sand have shown that, surprisingly, the microspheres with a low content in aluminum (25–33%) give, in general, the best results regarding "veining" and penetration, in turn maintaining the mechanical properties of the core obtained, moreover observing that an increase in the percentage of aluminum in the microspheres does not imply an improvement in the results of said effects ("veining" and penetration), but, on occasions, the opposite occurs [see Table 5, (Example 5)].

Moreover, the studies performed showed that the best results regarding veining and penetration do not only depend on the aluminum content, but other factors also have an influence, such as the size of the microspheres and the thickness of their walls. Particularly, it has been observed that hollow microspheres of aluminum silicate are suitable having a wall thickness between 3 and 10% of the microsphere diameter and a particle size between 10 and 350 micrometers ($\mu$m).

As may be seen in Table 4 (example 4), the microspheres giving the best results are those identified as Metaspheres 50 and Extendospheres SG, since they have a crushing strength of 189.37 kg/cm$^2$ (2.700 psi) with an aluminum content between 25 and 30% by weight, a wall thickness of 5%, with respect to the particle diameter (Extendospheres SG) and from 3 to 7% with respect to the diameter of the particle (Metaspheres 50), and an average particle size of 150 $\mu$m (Extendospheres SG) and between 10 and 250 $\mu$m (Metaspheres 50).

The molding sand of the invention may also contain other conventional components, like casting aggregates, binders and other optional components used in this sector of the technique.

The invention also provides a process to manufacture a core or chill mold by means of a cold process comprising:
 (A) introducing the molding sand, purpose of this invention, into a mold to form a core or non-cured mold;
 (B) placing said core or non-cured mold of stage (A) into contact with a gaseous cured catalyst;
 (C) permitting said core or non-cured mold resulting from stage B) to cure until said core or mold may be handled; and
 (D) separating said core or mold from the mold.

In another embodiment, the invention also provides a process to manufacture iron casting comprising:
 (A) inserting the core or mold manufactured from the molding sand, purpose of this invention, in a casting device;
 (B) pouring the metal, in a liquid state, in said casting device;
 (C) letting the metal poured into the casting device cool and solidify; and
 (D) separating the molten metal piece from the casting device.

The following examples serve to illustrate the invention. In Table 1, the main characteristics of the hollow microspheres of aluminum silicate used in the execution of these examples are shown.

TABLE 1

Characteristics of different hollow microspheres of aluminum silicate

| Product | Aluminum content (%) | Wall thickness | Particle size (μm) | Crushing resistance (kg/cm²) | Softening point (° C.) |
|---|---|---|---|---|---|
| Extendospheres SLG | 43, 3 | = 10% Ø | 10–300 | 562, 48 | 1.800 |
| Extendospheres SL180 | 43, 3 | = 10% Ø | 10–180 | 562, 48 | 1.800 |
| Extendospheres SL150 | 43, 3 | = 10% Ø | 10–150 | 562, 48 | 1.800 |
| Extendospheres SG | 25–30 | = 10% (radio) | 10–300 (media 130) | 189, 37 | 1.200–1.350 |
| Extendospheres XEG | 25–30 | = 10% (radio) | 10–350 (media 162) | 189, 37 | 1.200–1.350 |
| Extendospheres XOL200 | 15 | | 100 (media) | 7, 03 | 1.000 |
| Metaspheres 50 | 26–33 | 3–7% Ø | 10–250 | 196, 8–1.968, 1 | 1.200–1.350 |

Extendospheres is a trade mark of The Pq Corporation
Metaspheres is a trade mark of Microfine Minerals Ltd.

EXAMPLE 1

Study of the Use of Hollow Microspheres of Aluminum Silicate as an Additive For Molding Sands To assess the possible use of hollow microspheres of aluminum silicate as an additive for molding sands, destined to manufacture casting cores, on the one hand some cores were formed using different resins and conventional additives, and on the other hand, other cores from a molding sand, to which hollow microspheres of aluminum silicate had been added, then studying "veining" and the tensile strength of the cores obtained. The techniques used to manufacture the different cores were conventional for each case.

The distinctive components for the different mixtures used to manufacture the cores, are summarized below (Table 2). In all the cases, 2% resin was used. The catalyst used in preparation 02 and 03 was $SO_2$ (gas) whilst in the remaining preparations, the catalyst used was gaseous methylethylamine (DMEA).

TABLE 2

Starting mixtures

| Preparation | Resin | Molding sand |
|---|---|---|
| 01 | Phenolic urethane | Silica sand (*) |
| 02 | Epoxy acrylic | Silica sand (*) |
| 03 | Acrylic | Silica sand (*) |
| 04 | Phenolic urethane | Silica sand (*) + 10% hollow microspheres of aluminum silicate (invention) |
| 05 | Phenolic urethane | Recovered furanic sand |
| 06 | Phenolic urethane | 70/30 silica sand (*)/Chromite |
| 07 | Phenolic urethane | 50/50 silica sand (*)/Chromite |
| 08 | Phenolic urethane | Silica sand (*) + 2% BR-022 |
| 09 | Phenolic urethane | Silica sand (*) + 2% coal |
| 10 | Phenolic urethane | seggar clay |
| 11 | Phenolic urethane | 50/50 electrofused silica |
| 12 | Phenolic urethane | treated olivine |
| 13 | Phenolic urethane | Thermally recovered sand |
| 14 | Phenolic urethane | Silica sand (*) + 10% Veinseal 14000 |

(*): Silica sand AFA = 50 rounded type, % Si >97%

Once the piece was prepared, the results were studied the value "10" to the maximum value of "veining" and a value "0" to the minimum value of "veining". Besides "veining", tensile strength was evaluated.

Figure 1:
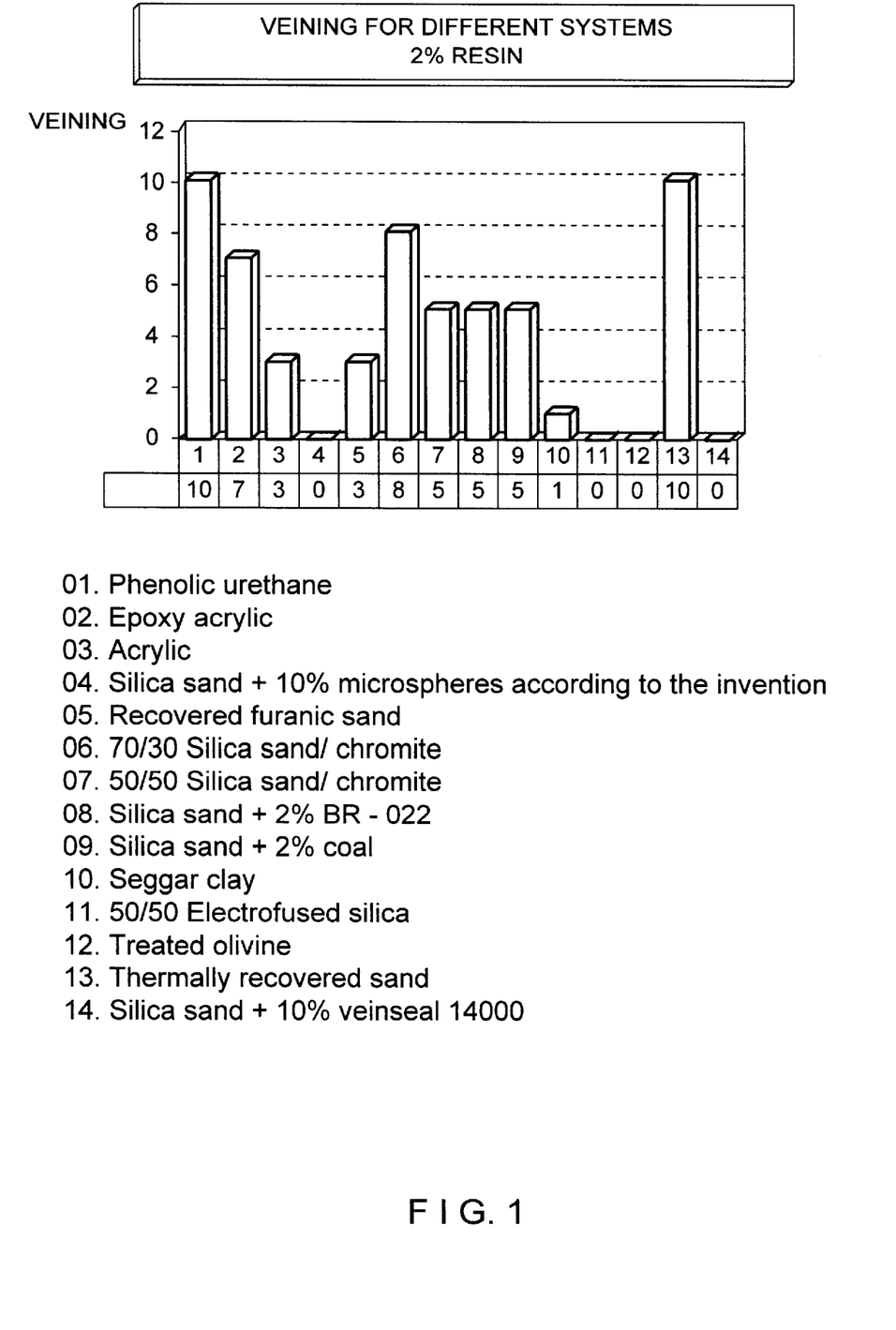
FIG. 1 shows a bar diagram in which the "veining" effect is seen for different techniques of core shaping, position 04 corresponding to the technique based on the use of a molding sand of the invention containing 10% by weight, of hollow microspheres of aluminum silicate.
Figure 2:
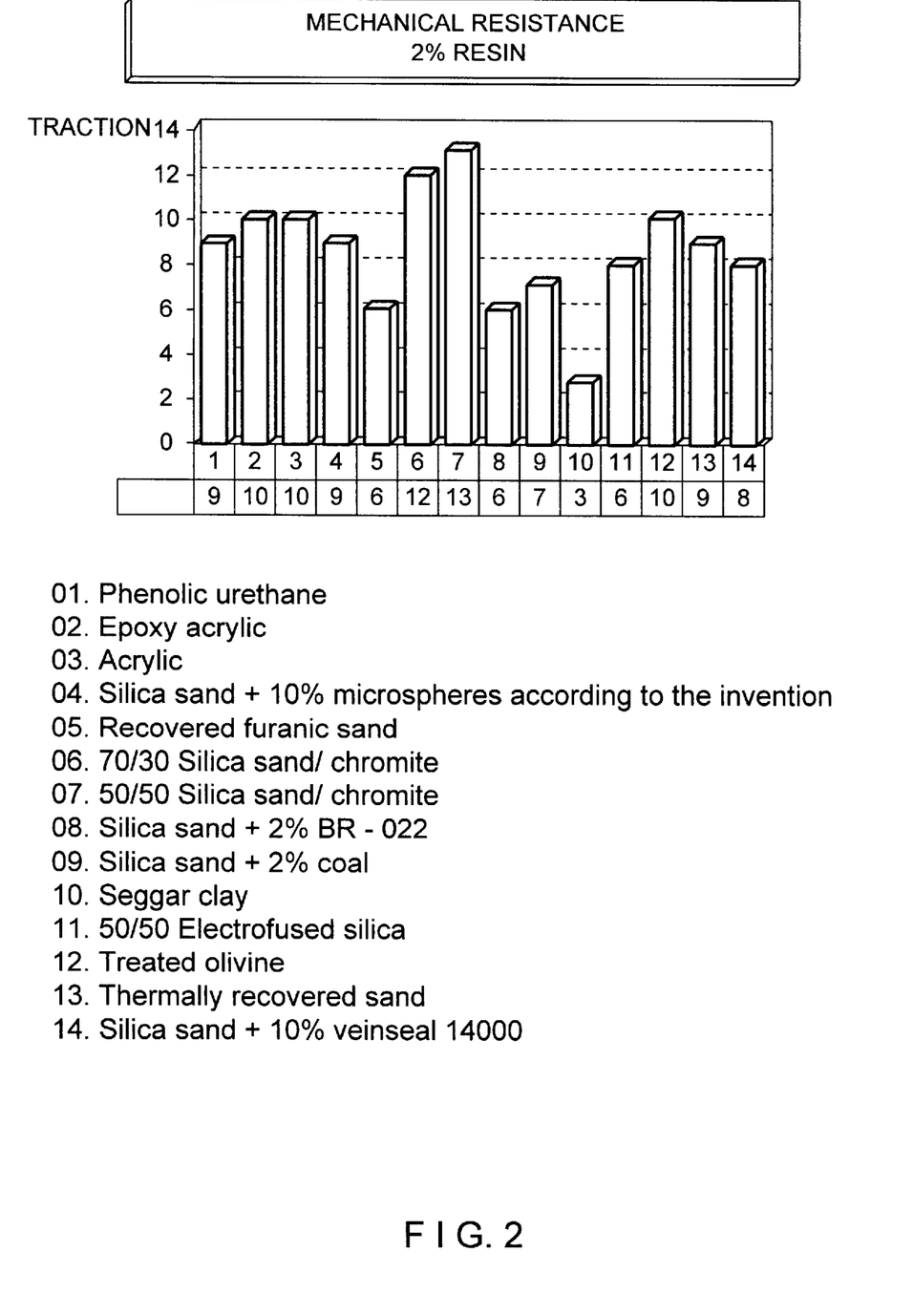
FIG. 2 shows a bar diagram in which the mechanical resistance obtained is seen according to the different techniques of core manufacture, the position 04 corresponding to the technique based on the use of a molding sand of the invention containing 10% by weight of hollow microspheres of aluminum silicate.

In FIGS. 1 and 2, bar diagrams are shown indicating the "veining" effect and tensile strength of the cores obtained. In the position 04, the properties obtained with the core obtained from molding sand containing microspheres of aluminum silicate at a percentage of 10% are shown, it being possible to observe the total absence of the "veining" effect and some good tensile strength properties.

EXAMPLE 2

Density of Different Cores

The density of different cores obtained according to different manufacturing techniques has been determined including, for comparative purposes, a core manufactured from a molding sand containing hollow microspheres of aluminum silicate, purpose of this invention. The cores, whose density has been evaluated were prepared using the sands and additives listed below:

[1]: Additives of titanium oxide [U.S. Pat. No. 4,735,973] (Veinseal).
[2]: Hollow microspheres of aluminum silicate (Invention).
[3]: Rounded silica.
[4]: Sub-angular silica.
[5]: 70/30 Rounded silica/chromite.
[6]: 90/10 Silica/Additive of titanium oxide [U.S. Pat. No. 4,735,973] (Veinseal).
[7]: 90/10 Silica/Hollow microspheres of aluminum silicate (invention).

Figure 3:
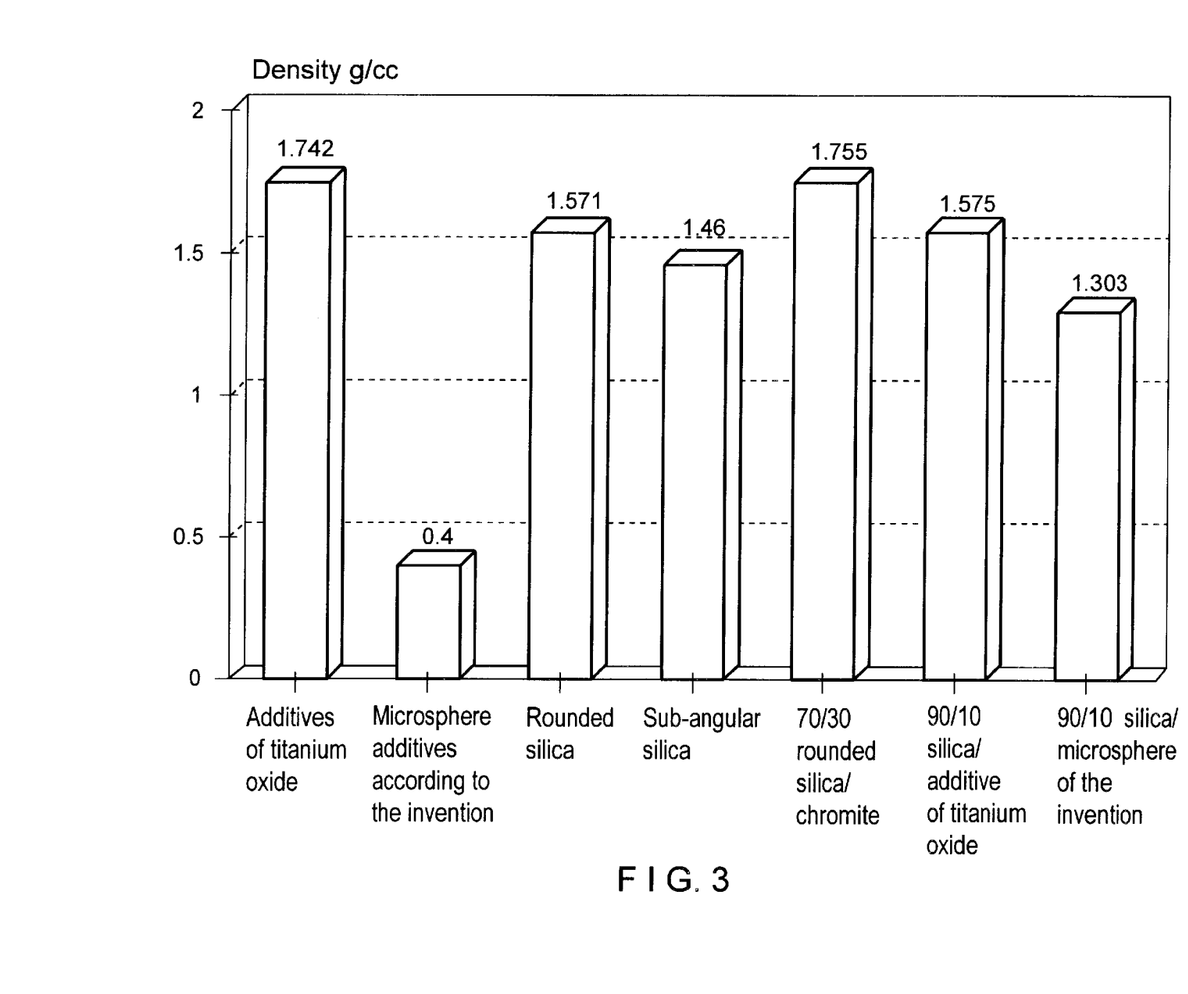
FIG. 3 shows a bar diagram in which the density of the cores obtained is shown, according to the different manufacturing techniques.

The results obtained are shown in FIG. 3, where it may be appreciated that the cores manufactured from molding sands containing hollow microspheres of aluminum silicate, have a very reduced density with respect to that of the other cores, a density permitting the reduction of gas production and penetration in the piece obtained.

EXAMPLE 3

Comparative Example

Some cores were prepared as from some molding sands containing different amounts (0, 5%, 10% y 20%) of an additive selected between:

(i) hollow microspheres of aluminum silicate, and (ii) additives of titanium oxide according to the North American Patent U.S. Pat. No. 4,735,973 (Veinseal), and the effect of the same, both on "veining" and penetration has been evaluated.

The cores were prepared by mixing the sand (C-55) with 0.5%, 10% or 20% by weight of the additive in question and to the resulting mixtures, the suitable resins were added, formed and cured.

Once the different pieces were prepared, the results were evaluated, giving the value "10" to the maximum level of "veining" and penetration and the value "0" to the minimum level of veining and penetration. To determine the penetration of the metal in the mold, the test "Penetration 2×2 test casting" [AFS Transactions] was used, in which the cavities of the core in the test mold were visually examined for the existence of metal penetration.

Figure 4:
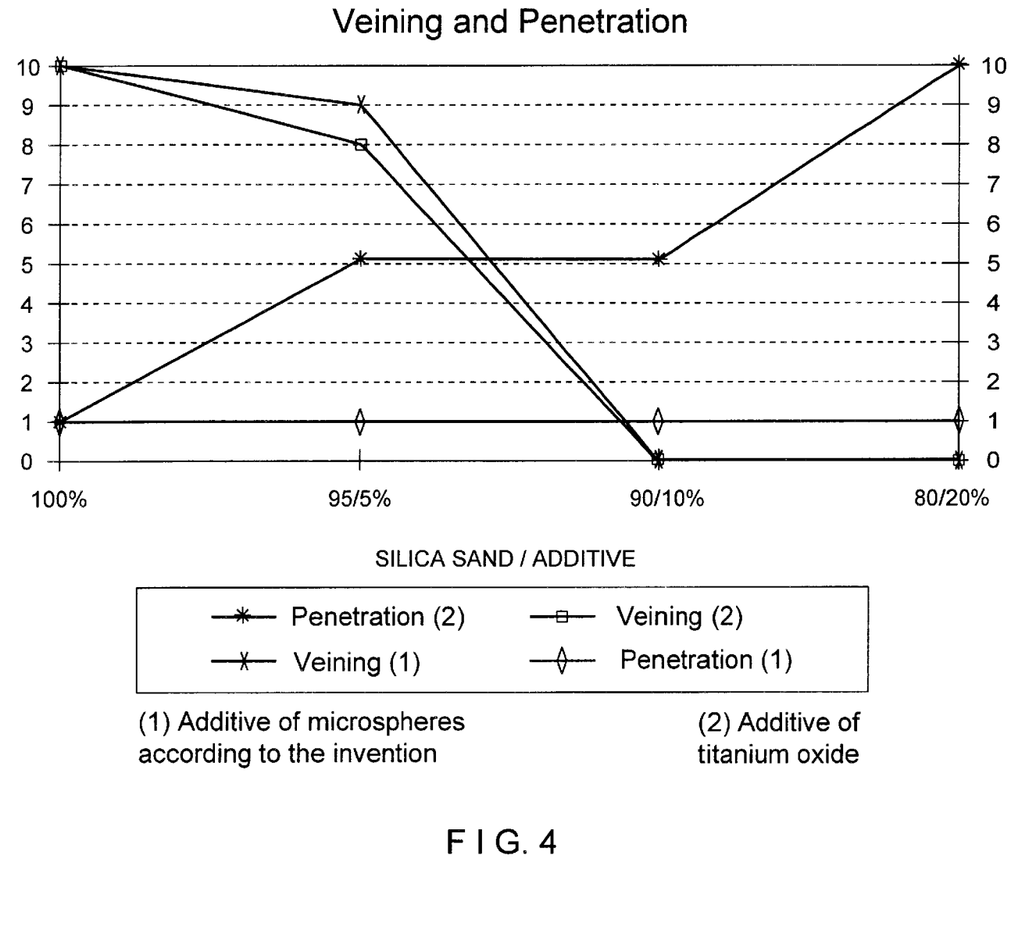
FIG. 4 shows a comparative diagram of "veining" and penetration obtained with molding sands containing hollow microspheres of aluminum silicate (invention) and molding sands containing titanium oxide according the U.S. Pat. No. 4,735,973.

The results obtained are shown in FIG. 4, where it is clearly seen that the "veining" in both techniques is very similar and is gradually reduced until it disappears when the percentage of additive gradually increases until reaching 10%. However, the penetration using additives of titanium oxide increases as the percentage of additive increases, whilst when using hollow microspheres of aluminum silicate as an additive, the penetration remains constant and at a very reduced level.

EXAMPLE 4

Preparation of Cores Using Hollow Microspheres of Aluminum Silicate as an Additive Some cores were prepared (crushing trials) consisting of molding sand, to which different amounts (0.5%, 10% and 20%) of hollow microspheres of aluminum silicate had been added, and the incidence thereof on the tensile strength of the cores obtained was evaluated.

The test pieces were prepared by mixing the sand (C-55) with 0.5%, 10% or 20% by weight of some hollow microspheres of aluminum silicate and to the resulting mixture, the appropriate resin mixture was added With the mixture obtained, the crushing trials were prepared which were cured with the suitable gas.

Figure 5:
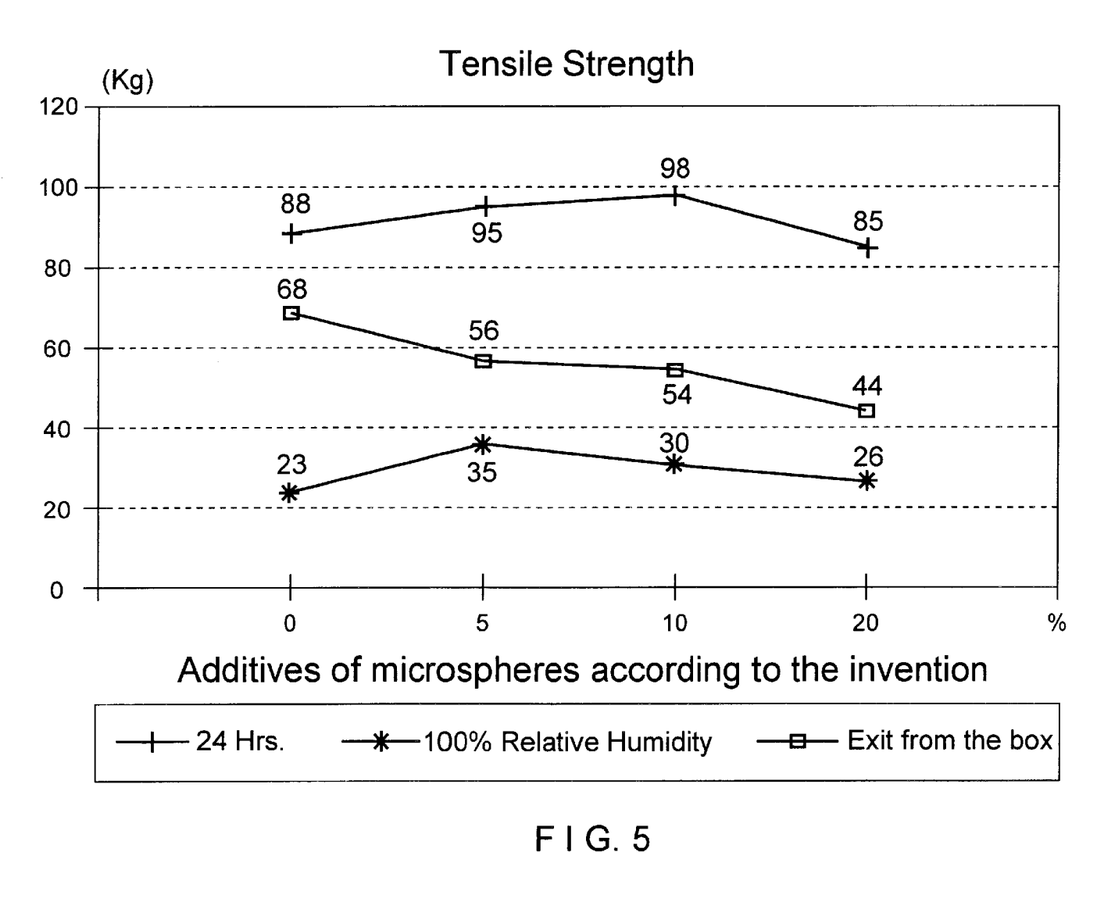
FIG. 5 shows a bar diagram in which the tensile strength of cores obtained with molding sands of this invention is shown, containing different percentages of hollow microspheres of aluminum silicate, the curves corresponding to the tensile strength at the exit of the box, after 24 hours and with a relative humidity of 100% being represented.

The results obtained are collected in FIG. 5, where the tensile strength of the cores obtained with different percentages of the additive, purpose of the invention, are shown, representing the curves corresponding to the tensile strength at the exit of the box, after 24 hours and with a relative humidity of 100%.

By means of a process similar to the above, some cores were prepared as from the molding sands indicated in Table 3, obtained by mixing the sand (C-55) with 0.5%, 10% or 20% by weight of hollow microspheres of aluminum silicate. In all cases, 1% Isocure® 325 (Ashland) resin and 1% Isocure® 625 (Ashland) resin, and DMEA as a catalyst were used.

TABLE 3

| | Molding sands | |
|---|---|---|
| Composition | C-55 sand (% by weight) | Additive (% by weight) |
| I | 100 | 0 |
| II | 95 | 5 |
| III | 90 | 10 |
| IV | 80 | 20 |

The cores obtained were submitted to some abrasion resistance tests (Scratch Hardness, SH) and tensile strength tests (Tensile Hardness, TS). The results obtained are shown in Table 4.

TABLE 4

| | Mechanical resistances | | | | | | | |
|---|---|---|---|---|---|---|---|---|
| Resistance | I | | II | | III | | IV | |
| composition | TS | SH | TS | SH | TS | SH | TS | SH |
| 2 cc. 302 | 68 | 94 | 56 | 93 | 54 | 92 | 44 | 90 |
| 1 hour | 76 | 95 | 72 | 94 | 74 | 96 | 60 | 92 |
| 24 hours | 88 | 98 | 95 | 97 | 98 | 97 | 85 | 96 |
| 1 h. Air and 24 h. 100% humidity | 23 | 73 | 35 | 86 | 30 | 79 | 26 | 74 |
| Test piece weight | 448.9 | | 425.0 | | 385.8 | | 318.8 | |

The following examples were made with the purpose of selecting the most suitable hollow microspheres of aluminum silicate for their use as an additive in molding sands.

EXAMPLE 5

Evaluation of Different Hollow Microspheres of Aluminum Silicate as an "Anti-Veining" Additive To evaluate the "anti-veining" behavior of different types of microspheres of aluminum silicate, some test pieces for crushing tests were prepared, consisting of molding sand to which different amounts of the microspheres to be evaluated had been added.

The test pieces were prepared by mixing the sand (C-55) with 10% or 20% by weight of the microspheres and to the resulting mixture 0.75% Isocure® 325 (Ashland) and 0.75% Isocure® 625 (Ashland) were added. With the mixture obtained, some test pieces for crushing were made, gassing them with Isocure® 720 (Ashland) Afterwards, they were placed in a mold for their melting with gray iron at 1,420° C.

Once the piece had been cooled, the results were evaluated, giving the value "10" to the maximum level of "veining" and penetration and the value "0" to the minimum level of "veining" and penetration. To determine the penetration of the metal in the mold, the test "Penetration 2×2 test casting" [AFS Transactions] was used, in which the cavities of the core were examined in the test mold to visually examined the existence of metal penetration.

The results obtained are shown in Table 5, where it may be appreciated that the best results regarding "veining" and penetration (that is, those in which "veining" and penetration was obtained with a value of zero or very near to zero) were obtained when using 20% by weight of the hollow microspheres of aluminum silicate with an aluminum content between 25 and 33% (Extendospheres SG and Metaspheres SLG, SL180 and SL150, with an aluminum content near to 45% by weight) which gave the worse results in general.

TABLE 5

Study of "anti-veining" products
Test pieces for crushing
Isocure ® 325/ Isocure ® 625 (1.5% resin total)

| Test piece No. | C-55 sand | Test piece weight (g) | SL 180 | SL 150 | SLG | Meta. 50 | XEG | SG | XOL 200 | Veining | Penetration |
|---|---|---|---|---|---|---|---|---|---|---|---|
| Control A | 100 | 175, 8 | — | — | — | — | — | — | — | 8 | 2 |
| 1 | 90 | 151, 5 | 10 | — | — | — | — | — | — | 9 | 2 |
| 2 | 80 | 122, 2 | 20 | — | — | — | — | — | — | 9 | 2 |
| 3 | 90 | 150, 1 | — | 10 | — | — | — | — | — | 9 | 2 |
| 4 | 80 | 124, 3 | — | 20 | — | — | — | — | — | 9 | 4 |
| 5 | 90 | 147, 2 | — | — | 10 | — | — | — | — | 9 | 1 |
| 6 | 80 | 121, 0 | — | — | 20 | — | — | — | — | 10 | 0 |
| 7 | 90 | 150, 0 | — | — | — | 10 | — | — | — | 4 | 3 |
| 8 | 80 | 123, 2 | — | — | — | 20 | — | — | — | 0 | 0 |
| 9 | 90 | 144, 6 | — | — | — | — | 10 | — | — | 2 | 2 |
| 10 | 80 | 117, 0 | — | — | — | — | 20 | — | — | 0 | 1 |
| 11 | 90 | 147, 0 | — | — | — | — | — | 10 | — | 2 | 0 |
| 12 | 80 | 122, 0 | — | — | — | — | — | 20 | — | 0 | 0 |
| 13 | 90 | 175, 4 | — | — | — | — | — | — | 10 | 9 | 2 |
| 14 | 95 | 176, 0 | — | — | — | — | — | — | 5 | 10 | 5 |

[SL 180, SL150, SLG, XEG, SG and XOL200 are different types of Extendospheres; Meta. 50: Metaspheres 5°; (Table 1)]

EXAMPLE 6

Evaluation of the Mechanical Resistance of "Anti-Veining" Additives

To evaluate the mechanical resistance of different types of microspheres of aluminum silicate, some tensile strength test pieces were prepared, consisting of sand to which different amounts of the microspheres to he evaluated had been added.

The test pieces were prepared by mixing the sand (C-55) with 10% or 20% by weight of the microspheres and to the resulting mixture, 0.75% Isocure® 325 (Ashland) and 0.75% Isocure® 625 (Ashland) were added. The catalyst used was DMEA. With the mixture obtained, some tensile strength test pieces were made, which were subjected to abrasion resistance (SH) and tensile strength (TH) tests. The result obtained are shown in Table 6, where it is observed that in spite of the good results obtained in the "veining" and penetration effects, also satisfactory mechanical resistances were obtained, for the cores prepared from the molding sands of the invention.

TABLE 6

Study of the mechanical resistances of agglomerated products (sand/microspheres)

| Resin<br>Amount<br>Catalyst<br>Product<br>Agglomerate | ISOCURE ® 325<br>ISOCURE ® 625<br>1.5<br>DMEA<br>100% C-55<br>(Control) | | ISOCURE ® 325<br>ISOCURE ® 625<br>1.5<br>DMEA<br>90% C-55<br>10% EX XEG | | ISOCURE ® 325<br>ISOCURE ® 625<br>1.5<br>DMEA<br>80% C-55<br>20% EX XEG | | ISOCURE ® 325<br>ISOCURE ® 625<br>1.5<br>DMEA<br>90% C-55<br>10% EX SG | | ISOCURE ® 325<br>ISOCURE ® 625<br>1.5<br>DMEA<br>80% C-55<br>20% EX SG | | ISOCURE ® 325<br>ISOCURE ® 625<br>1.5<br>DMEA<br>80% C-55<br>20% MS 50 | |
|---|---|---|---|---|---|---|---|---|---|---|---|---|
| | TS | SH | TS | SH | TS | SH | TS | SH | TS | SH | TS | SH |
| 3 cc. 3' | 50 | 92 | 67 | 92 | 56 | 90 | 63 | 92 | 57 | 91 | 50 | 90 |
| 1 hour | 73 | 96 | 72 | 94 | 58 | 91 | 70 | 93 | 59 | 93 | 48 | 73 |
| 24 hours | 83 | 97 | 78 | 94 | 63 | 92 | 86 | 95 | 73 | 95 | 66 | 87 |
| 1 h air & 24 h 100% humidity | 60 | 94 | 61 | 89 | 59 | 90 | 70 | 93 | 60 | 90 | 49 | 83 |
| Density 3 test pieces | 228.3 | | 186.0 | | 153.3 | | 192.3 | | 156.0 | | 156.0 | |

| 6 hours of life in bank | | | | | | | | | | | | |
|---|---|---|---|---|---|---|---|---|---|---|---|---|
| | TS | SH | TS | SH | TS | SH | TS | SH | TS | SH | TS | SH |
| 3 cc. 3' | 38 | 83 | 40 | 81 | 25 | 43 | 38 | 80 | 22 | 49 | 15 | 32 |
| 1 hour | 46 | 91 | 44 | 83 | 26 | 44 | 40 | 82 | 25 | 49 | 12 | 31 |
| 24 hours | 55 | 94 | 48 | 86 | 30 | 47 | 48 | 85 | 29 | 50 | 13 | 40 |
| 1 h air & 24 h 100% humidity | 48 | 92 | 38 | 81 | 23 | 40 | 44 | 81 | 20 | 40 | 11 | 32 |

[MS: Metaspheres; EX: Extendospheres; TS: tensile strength; SH: abrasion resistance]

EXAMPLE 7

Evaluation of Mechanical Resistances of Different Hollow Microspheres of Aluminum Silicate To evaluate the mechanical resistance of different hollow microspheres of aluminum silicate at 100%, some tensile strength test pieces were prepared, by mixing the microspheres (100%) to be evaluated with 3% Isocure® 323 (Ashland) and 3% Isocure® 623 (Ashland) With the mixtures obtained, some tensile strength test pieces were made which were gassed with Isocure® 702 (Ashland) The test pieces obtained were submitted to abrasion resistance (SH) and tensile strength (TH) tests. The result obtained are shown in Table 7, where it may be appreciated that the best results were obtained with Extendospheres XEG microspheres, having an average particle size (162 μm) greater than the Extendospheres SG microspheres(130 μm).

TABLE 7

Study of mechanical resistances of different additives (with Isocure) used in the manufacture of sleeves

| Microsphere | EX SL180 | | EX SL150 | | EX SLG | | METASPHERES 50 | | EX SG | | EX XEG | |
|---|---|---|---|---|---|---|---|---|---|---|---|---|
| Resin | ISOCURE 323/623 | | ISOCURE 323/623 | | ISOCURE 323/623 | | ISOCURE 323/623 | | ISOCURE 323/623 | | ISOCURE 323/623 | |
| Resin amount | 6 | | 6 | | 6 | | 6 | | 6 | | 6 | |
| Catalyst | DMEA | | DMEA | | DMEA | | DMEA | | DMEA | | DMEA | |
|  | TS | SH | TS | SH | TS | SH | TS | SH | TS | SH | TS | SH |
| 4 cc. 3' | 49 | 80 | 49 | 82 | 47 | 78 | 48 | 81 | 36 | 71 | 60 | 83 |
| 1 hour | 63 | 86 | 52 | 84 | 66 | 87 | 43 | 80 | 50 | 80 | 66 | 83 |
| 24 hours | 70 | 92 | 67 | 86 | 67 | 90 | 40 | 79 | 72 | 94 | 78 | 95 |
| 1 h air & 24 h 100% humidity | 60 | 85 | 43 | 77 | 63 | 87 | 38 | 75 | 54 | 79 | 63 | 94 |

[Ex: Extendospheres; TS: tensile strength; SH: abrasion resistance]

What is claimed is:

1. A composition for the manufacture of cores and chill molds which comprises a molding sand, a resin and hollow microspheres of aluminum silicate, said hollow microspheres of aluminum silicate being present in the composition in an amount between 1 and 30% by weight of the total amount of the composition and having an aluminum content between 15 and 45% by weight of the microspheres to absorb expansion when the core or chill mold is heated by a molten casting metal and thereby to prevent formation of fissures in the core or chill mold and veining of a cast article.

2. A composition according to claim 1, wherein said hollow microspheres of aluminum silicate are present in an amount of 5 and 25% by weight of the total amount of the composition.

3. A composition according to claim 1, wherein said hollow microspheres of aluminum silicate have an aluminum content between 20 and 35% by weight, of the microspheres.

4. A composition according to claim 1, wherein said hollow microspheres of aluminum silicate have a wall thickness between 3 and 10% of the microsphere diameter.

5. A composition according to claim 1, wherein said hollow microspheres of aluminum silicate have a particle size between 10 and 350 μm.

6. A cold process for the manufacture of a core or chill mold comprising:
    introducing a composition for the manufacture of cores and chill molds according to claim 1, in a forming mold to form a non-cured core or mold;
    contacting said non-cured core or mold with a gaseous curing catalyst until said core or mold may be handled; and
    separating said core or chill mold from the forming mold.

7. A core or chill mold produced according to the process of claim 6.

8. A process for the manufacture of an iron casting, which comprises:
    inserting a core or chill mold, according to claim 7, in a casting device;
    pouring an iron casting composition in a liquid state, in said casting device;
    allowing the casting composition poured into the casting device to cool and solidify; and
    removing the casting composition thus solidified from the casting device as the target iron casting.

9. A method of producing an iron casting comprising:
    introducing a molding sand into a forming mold, said molding sand having a composition comprising:
        sand, a resin and hollow microspheres of aluminum silicate, said hollow microspheres of aluminum silicate being present in the composition in an amount between 1 and 30% by weight of the total amount of the composition and having an aluminum content between 15 and 45% by weight of the microspheres,
    forming a non-cured core or mold in said composition,
    contacting said non-cured core or mold with a gaseous curing catalyst until said core or mold may be handled,
    inserting the core or mold in a casting device,
    pouring an iron casting composition in a liquid state, in said casting device;
    allowing the iron casting composition poured into the casting device to cool and solidify; and
    removing the thus solidified iron casting from the casting device,
    said iron casting being free of surface defects including veining due to smoothness of the core or mold as a result of absorption of expansion by said microspheres when the core or mold is heated by the casting metal, whereby the iron casting is the target product as is without need for machining.

10. A method of reducing surface defects including veining in the surface of an iron casting produced by a method comprising:
    introducing a molding composition into a forming mold,
    forming a non-cured core or mold of said composition,
    contacting said non-cured core or mold with a gaseous curing catalyst until said core or mold may be handled,
    inserting the core or mold in a casting device,
    pouring an iron casting composition in a liquid state, into said casting device;

allowing the iron casting composition poured into the casting device to cool and solidify; and removing the thus solidified iron casting from the casting device, said iron casting being free of surface defects including veining by forming said molding composition as follows:

sand, a resin and hollow microspheres of aluminum silicate, said hollow microspheres of aluminum silicate being present in the molding composition in an amount between 1 and 30% by weight of the total amount of the molding composition and having an aluminum content between 15 and 45% by weight of the microspheres the presence of said microspheres in the molding composition as aforesaid producing a smoothness of the core or mold as a result of absorption of expansion by said microspheres when the core or mold is heated by the casting metal, whereby the iron casting is obtained as the target product, as is, without need for machining.

* * * * *